Dec. 31, 1963    J. E. EGLE    3,116,430
ELECTRIC MOTOR WITH BUILT-IN RELAY
Filed Dec. 14, 1960    2 Sheets-Sheet 1
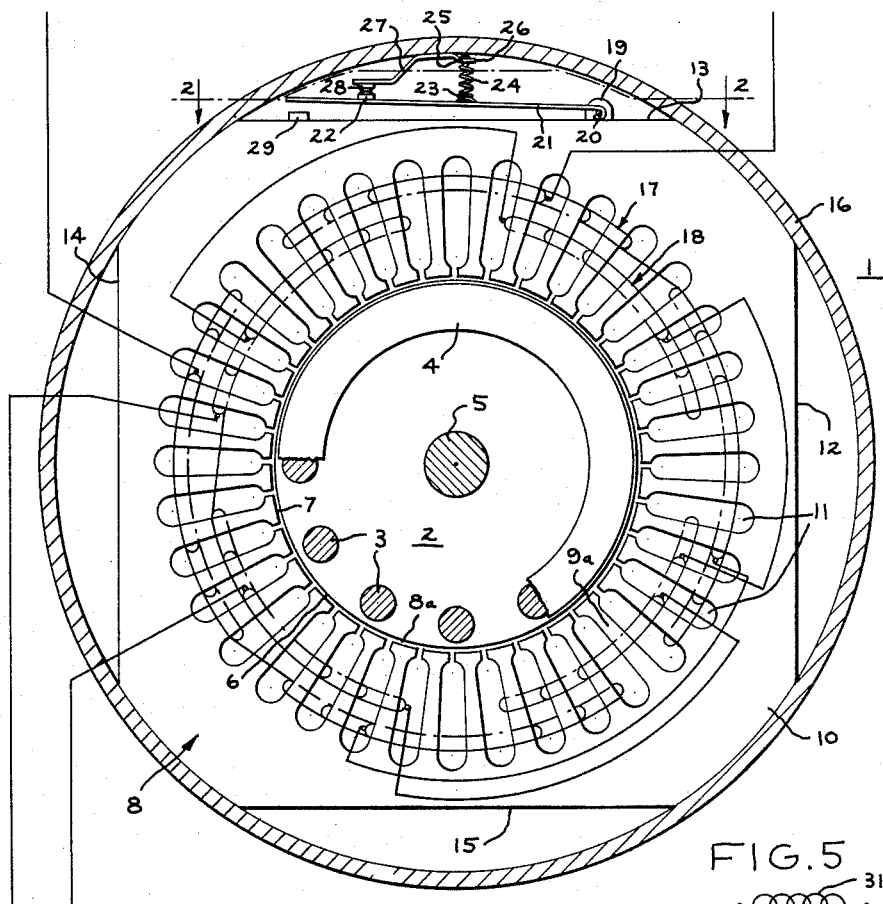
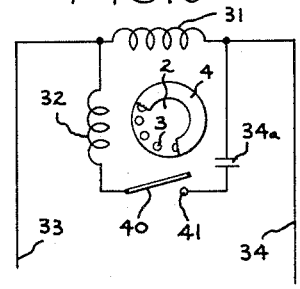
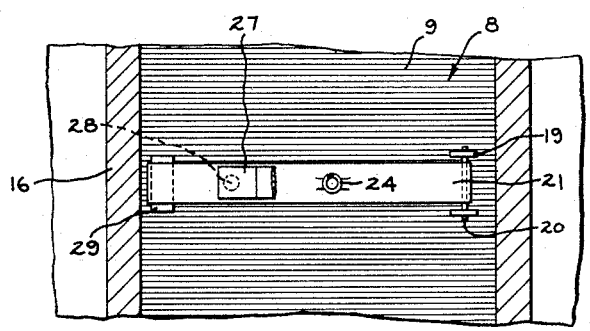
INVENTOR.
JOHN E. EGLE
BY
HIS ATTORNEY Dec. 31, 1963   J. E. EGLE   3,116,430
ELECTRIC MOTOR WITH BUILT-IN RELAY
Filed Dec. 14, 1960   2 Sheets-Sheet 2
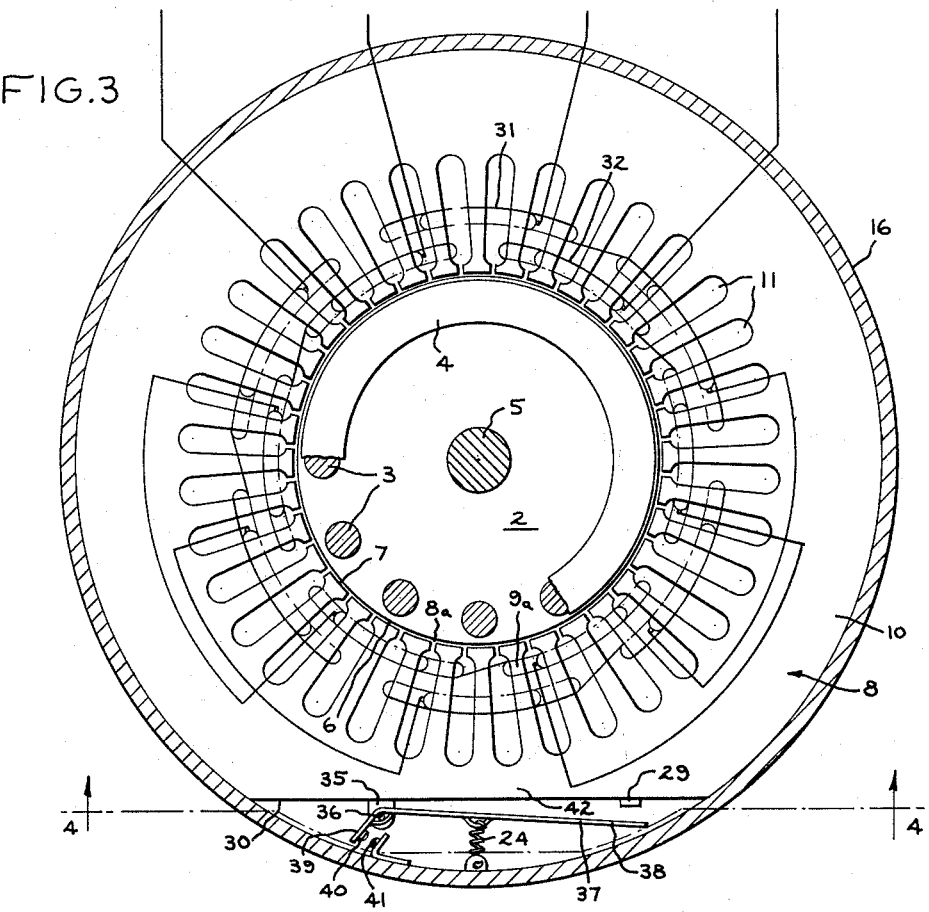
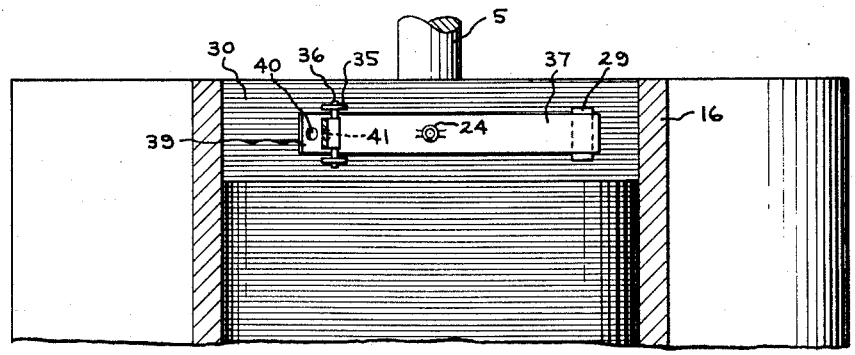
INVENTOR.
JOHN E. EGLE
BY
HIS ATTORNEY United States Patent Office 3,116,430
Patented Dec. 31, 1963

3,116,430
ELECTRIC MOTOR WITH BUILT-IN RELAY
John E. Egle, Georgetown, Ind., assignor to General
Electric Company, a corporation of New York
Filed Dec. 14, 1960, Ser. No. 75,842
5 Claims. (Cl. 310—68)

This invention relates to electric motors, and more particularly to an electric motor which has a relay built in so as to utilize the magnetic material of the motor.

As is well known, the phenomenon of magnetic flux which occurs in an electric motor is basically the same as that which causes the operation of a relay. In both structures, a magnetic flux is created in a core of magnetic material by energization of a winding positioned on the core. Despite this knowledge, and despite the frequency with which a relay of some sort is needed in connection with an electric motor, no structure is known to have been provided where both the motor winding and the motor core are fully utilized to provide, in addition, the effect of a relay.

It is accordingly an object of this invention to provide an electric motor which has a built-in relay utilizing the motor core and the motor winding.

A further object of my invention is to provide such an electric motor wherein the built-in relay is arranged so as to be responsive to starting current, so that it may be utilized as the disconnecting means for the start winding conventionally provided in many domestically used induction type electric motors.

Briefly stated, in accordance with one aspect of my invention, I provide an electric motor which has the usual inner and outer members of magnetic material. The inner member is arranged to be rotatable, and is in the form of a cylinder of magnetic material. The outer member, also formed of magnetic material is positioned around the inner member concentrically therewith and has a cylindrical bore which forms an annular air gap with the inner member. In effect, the outer member is made up of two sections, an inner section which has a plurality of slots extending outwardly from the bore, and an outer or yoke section extending around the inner section. A running winding is positioned in at least some of the slots so as to cause the motor to operate and, in so doing, creating magnetic flux in the outer member during energization.

As an important feature of my invention, I position a movable member of magnetic material adjacent the outer surface of the yoke section biased to a first position away from that surface. A predetermined flux density in the part of the yoke adjacent the movable member causes it to move toward the yoke outer surface to a second position. The movable member controls a pair of electrical contacts which are engaged in one position of the member and disengaged in the other position thereof. With this arrangement, then, the same energization of the winding which causes operation of the motor provides for movement of the movable member from its first position to its second position. Thus, the movable member constitutes, together with the other motor parts, a relay which is built into the motor so as to be operative at the same time.

The subject matter which I regard as my invention is particularly pointed out and distinctly claimed in the concluding portion of this specification. My invention, however, both as to organization and method of operation, together with further objects and advantages thereof, may best be understood by reference to the following description taken in conjunction with the accompanying drawings.

In the drawings, FIGURE 1 is a side elevational view, partly schematic, of an electric motor formed in accordance with my invention;

FIGURE 2 is a view along line 2—2 in FIGURE 1;

FIGURE 3 is a side elevation view, partly schematic, of a second embodiment of my invention;

FIGURE 4 is a view along line 4—4 in FIGURE 3; and

FIGURE 5 is a schematic showing of a circuit in which the structure of FIGURES 3 and 4 may be advantageously used to cause the start winding of an induction motor to be disconnected as the motor comes up to speed.

Referring now to FIGURES 1 and 2 of the drawings, there is shown for illustrative purposes a single phase alternating current motor of the induction type, generally indicated by the numeral 1, having a substantially cylindrical rotatable member, or rotor 2. In the conventional manner, the rotor 2 may be provided with squirrel cage winding conductors 3 extending therethrough and short circuited together at each end by any appropriate means such as, for instance, the end ring partially shown by the numeral 4. Conventionally, rotor 2 also includes a shaft 5 by means of which the motor output may be used for any desired purpose.

The cylindrical surface 6 of rotor 2 cooperates with the bore or inner surface 7 of a stationary outer member, or stator, 8 to form an annular air gap 8a between the rotor 2 and the stator 8. It will be understood that both the rotor 2 and stator 8 are made of suitable magnetic material. Conventionally, this is done by stacking together thin laminations 9 of magnetic material such as iron (FIGURE 2). The laminations are held together by any suitable means (not shown) such as for instance welding or clamping along the outer edges, or cementing the laminations to each other.

Basically, the stator 8 includes two recognizably different sections, an inner section 9a and an outer section 10. The inner section 9a includes a plurality of slots 11 formed extending outwardly from the bore 7. The outer section 10 forms a yoke around the slots 11, that is, it provides a continuous magnetic path around the outside of the slots. While of necessity the rotor outer surface 6 and the stator bore 7 are, in cross section, formed as circles, this need not be the case with the outer surface of the stator 8. In fact, as shown in FIGURE 1, it may well be formed substantially as a square having flat sides 12, 13, 14, and 15 joined by rounded corners. The stator 8 may be secured within an appropriate casing 16; as shown, the casing may again be cylindrical so that there is some space between the flat sides of the stator 8 and the casing. It will be understood, of course, that the stator is formed so that although it may be provided with flat sides 12 through 15, the minimum depth from the outer surface to the slots 11 is sufficient to keep the density of the magnetic flux which passes through the yoke 10 (as will be described herebelow) within suitable limits.

Within the slots 11, suitable windings are provided in the conventional manner. For illustrative purposes these have been shown as including a main four pole winding, generally indicated by the numeral 17, and a start four pole winding, generally indicated by the numeral 18, the two windings being 90 electrical degrees removed from each other in space and also, in the conventional manner, either by resistance differences or otherwise, being displaced from each other in phase so as to provide a starting torque upon energization of both windings in parallel when rotor 2 is stationary.

Secured to flat outer surface 13 are upstanding members 19 supporting a pin 20 on which is pivoted an elongated member 21 formed of magnetic material. Member 21, which may, as shown, carry a contact 22, has one end 23 of a spring 24 secured to it. The other end 25 of the spring is secured to end 26 of a switch arm 27 rigidly secured to casing 16 so that the spring 24 exerts a bias on the member 21 causing it to pull up and away from the stator 8 into a position where contact 22 engages a contact 28 fastened at the end of contact arm 27.

When the windings 17 and 18 are energized, or when winding 17 is energized alone as may occur during running of the machine, the passage of electric current through the windings will in the conventional manner cause magnetic flux to be created within the stator 8. In those parts of the yoke 10 which are the thinnest, as at the centers of the flat portions, the flux density will be the highest since the amount of flux within the yoke 10 is not a function of the amount of iron provided but rather is dependent upon the ampere turns provided by the windings and the energizing current. When the flux density within the magnetic material forming that part of the yoke 10 adjacent member 21 reaches a certain level, the magnetic member 21 is pulled towards the surface 13 by the magnetic action to a second position in which the contacts 22 and 28 are separated. In this connection, a stop 29 may be provided if so desired.

The flux density in yoke 10, the distance from the yoke, and the shape of member 21 may be caused to have a suitable relationship so that, when the motor 1 is energized for operation, the contacts 22 and 28 are separated and remain separated during operation of the motor. Alternatively the contacts may be separated during the period when the current in the windings is high as is true during starting of the motor and may be allowed to return to a closed position under the influence of spring 24 when the current decreases to a relatively low level as is true during ordinary running of the machine. Also, the contacts may be open normally, and closed upon energization of the motor windings. In any event, it will be seen that many useful purposes may be served by causing the closing of contacts 22 and 28 to be controlled by the energization of the motor windings. It will further be seen that I obtain the relay action by the simple addition of a magnetic member in an appropriate relationship with the outer surface of a motor stator member.

Referring now to FIGURES 3 and 4, there is shown a second embodiment of my invention wherein the form of the stator is somewhat different and the built-in relay provides a particular motor function rather than a function controlled by the motor but outside thereof. In the machine of FIGURES 3 and 4, parts which are the same as those in FIGURE 1 are shown by like numerals. As in the first embodiment, rotor 2 is rotatably positioned within stator 8 which in turn is secured within casing 16. In the case of the second embodiment, the stator 8 is shown as having a single flatted portion 30 which, as may best be seen in FIGURE 4, does not even extend the full length of the machine but may be provided either at the end thereof as in the present case or at any point along its length.

Within the slots 11 there are positioned a main six pole winding 31 and a start six pole winding 32. In the conventional manner, these windings are connected in parallel, as schematically shown in FIGURE 5, across a suitable source of power by appropriate conductors such as those shown by the numerals 33 and 34. The windings are appropriately displaced in space and phase; the phase displacement may be achieved either by the design of the windings themselves or by an appropriate externally connected device such as the capacitor 34a schematically shown in FIGURE 5.

Returning to FIGURES 3 and 4, a pair of upstanding memebrs 35 are secured on flat portion 30 of the outer surface of stator 8 and a pin 36 extends between them so as to pivotably support a member 37 formed of magnetic material. The member 37 has a main portion 38 biased away from the surface 30 by spring 24. At one end, the member 37 has an extension 39 which carries a movable contact 40. Contact 40, when members 37 is in its position shown remote from the surface 30, is separated from a stationary contact 41. Referring to FIGURE 5, contacts 40 and 41 are arranged in series with the start winding 32.

It will be seen that the structure of FIGURES 3, 4 and 5 provides normally open contacts as opposed to the structure of FIGURE 1 in which the contacts were biased to a closed position by spring 24. When power is initially applied across conductors 33 and 34, the rotor 2 is stationary, i.e., it is in its "locked rotor" condition, and because of this fact a very high current passes through the low impedance winding 31. This high current causes a high flux density in the narrow yoke portion 42 which is formed by the flat surface 30, and as a result section 38 of magnetic member 37 is pulled downwardly toward stop 29. This causes the contacts 40 and 41 to be engaged. As a result, the start winding 32 is also energized and rotor 2 starts to rotate. As the rotor comes up to a speed within its normal range, the apparent impedance of the windings increases, as is well known to those skilled in the art, and therefore the current passing through them decreases. By proper design, the spring 24 may be arranged so that it overcomes the magnetic force resulting from the ordinary running current of the motor and pulls away to the position shown. Thus, the improved structure of my invention may be utilized as a start switch responsive to the high current of starting to close, and opening again as the current decreases to its running level.

It will be seen from the foregoing that the second embodiment of my invention, in addition to the broad advantages shown in connection with the use of a built-in relay by the description of FIGURES 1 and 2, permits the relay to be used as a starting relay, so that no additional relay components or starting centrifugal switch is necessary in order to disconnect the start winding 32 once the motor has been brought up to speed.

It will be recognized that, while two particular embodiments of my invention have been shown, many modifications are quite obvious. For instance, the optimum structure wherein magnetic member 37 extends peripherally of the stator has been shown but, of course, it is possible to utilize this structure wherein it extends axially and obtains substantially the same results. Also, of course, the particular types of motors shown in the embodiments are not intended to be restrictive with respect to the broad invention. It will further be clear that, by suitable design, even a conventionally round lamination without a flatted portion may be used if the movable magnetic member positioned on the periphery is made sufficiently sensitive to variations in flux density. However, it is preferred to utilize the structure either in connection with a specially provided flat portion as shown in the embodiment of FIGURES 3 and 4 or in connection with a stator core which inherently provides high flux density portions such as that shown in FIGURES 1 and 2.

Therefore, while my invention has been explained by describing particular embodiments thereof, it will be apparent that improvements and modifications may be made without departing from the scope of my invention as defined in the appended claims.

What I claim as new and desire to secure by Letters Patent of the United States is:

1. An electric motor comprising: a rotatable cylindrical inner member formed of magnetic material; a stationary outer member formed of magnetic material and positioned around said inner member concentrically therewith, said outer member having a cylindrical bore forming an air gap with said inner member, an inner section with a plurality of slots extending outwardly from said bore, and a yoke section extending around said inner section; a running winding positioned in at least some of said slots so as to create magnetic flux in said outer member during energization of said winding; said yoke section being formed to provide increased magnetic flux in a portion thereof; a movable member formed of magnetic material positioned adjacent the outer surface of said yoke section at said portion thereof; means biasing said movable memebr to a first position away from said outer surface, said movable member moving toward said outer surface to a second position in response to a predetermined flux density in said portion of said yoke; and a pair of electrical contacts controlled by said movable member, said contacts being engaged in one position and disengaged in the other position of said movable member.

2. The apparatus defined in claim 1 wherein said movable member is pivotably secured adjacent one end thereof to said outer surface.

3. The apparatus defined in claim 1 wherein said contacts are engaged in said first position of said movable member and are disengaged in said second position of said movable member.

4. The apparatus defined in claim 1 wherein said contacts are engaged in said second position of said movable member and are disengaged in said first position of said movable member.

5. An induction type electric motor comprising: a rotatable inner squirrel cage rotor member; an outer stator member formed of a stacked plurality of laminations of magnetic material and positioned around said inner member concentrically therewith, said stator member having a cylindrical bore forming an air gap with said rotor member, an inner section with a plurality of slots extending outwardly from said bore, and a yoke section extending around said inner section; a running winding positioned in at least some of said slots and a start winding positioned in at least some of said slots, said start winding being displaced from said running winding in space and phase and being connected in parallel therewith, each of said windings being positioned so as to create magnetic flux in said outer member during energization thereof; said yoke section being formed to provide increased magnetic flux in a portion thereof; a movable member formed of magnetic material positioned adjacent the outer surface of said yoke section at said portion thereof; means biasing said movable member to a first position away from said outer surface, said movable member moving toward said outer surface to a second position in response to the flux density in said portion of said yoke which results from a locked rotor condition of said motor; and a pair of electrical contacts controlled by said movable member, said contacts being engaged in said second position and disengaged in said first position of said movable member, said biasing means returning said movable member to said first position when the flux density in said portion of said yoke decreases to that caused by the current in said motor operating within its usual speed range.

References Cited in the file of this patent

UNITED STATES PATENTS

| | | |
|---|---|---|
| 1,142,866 | Wilson | June 15, 1915 |
| 1,991,042 | Werner | Feb. 12, 1935 |
| 2,040,468 | Cole | May 12, 1936 |
| 2,040,470 | Cole et al. | May 12, 1936 |
| 2,386,683 | Hemphill | Oct. 9, 1945 |
| 2,489,098 | Marble | Nov. 22, 1949 |
| 2,992,343 | Meijer | July 11, 1961 |
| 3,080,494 | Ludin et al. | Mar. 5, 1963 |